US012639441B2

(12) United States Patent
Lien et al.

(10) Patent No.: US 12,639,441 B2
(45) Date of Patent: May 26, 2026

(54) RANDOMIZED OR PROGRAM-ERASE-CYCLE-DEPENDENT PROGRAM VERIFY SCHEME

(71) Applicant: Micron Technology, Inc., Boise, ID (US)

(72) Inventors: Yu-Chung Lien, San Jose, CA (US); Lakshmi Kalpana K Vakati, Fremont, CA (US); Dheeraj Srinivasan, San Jose, CA (US); Ting Luo, Santa Clara, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 18/784,133

(22) Filed: Jul. 25, 2024

(65) Prior Publication Data

US 2025/0086282 A1    Mar. 13, 2025

Related U.S. Application Data

(60) Provisional application No. 63/581,183, filed on Sep. 7, 2023.

(51) Int. Cl.
*G06F 21/57*        (2013.01)

(52) U.S. Cl.
CPC .................................. *G06F 21/57* (2013.01)

(58) Field of Classification Search
CPC ....................................................... G06F 21/57
See application file for complete search history.

(56) References Cited

U.S. PATENT DOCUMENTS

| | | | |
|---|---|---|---|
| 2017/0097830 A1* | 4/2017 | Ehrenberg | G06F 21/602 |
| 2017/0169896 A1* | 6/2017 | Kavalipurapu | G11C 16/3459 |
| 2022/0208288 A1* | 6/2022 | Sharma | G11C 16/10 |
| 2023/0040560 A1* | 2/2023 | Kim | G11C 11/5628 |
| 2023/0134281 A1* | 5/2023 | Raimondo | G11C 16/3459 |
| | | | 365/185.22 |
| 2024/0045946 A1* | 2/2024 | Plaquin | G06F 21/554 |
| 2024/0274213 A1* | 8/2024 | Negi | G11C 29/025 |

* cited by examiner

*Primary Examiner* — Beemnet W Dada

(74) *Attorney, Agent, or Firm* — Harrity & Harrity, LLP

(57) ABSTRACT

In some implementations, a memory device may receive a single-level cell (SLC) program command. The memory device may determine, based on at least one of a randomized variable associated with the memory or a program-erase cycle count associated with the memory, a program verify scheme to be performed when executing the SLC program command. The program verify scheme may be one of a scheme associated with performing a program verify operation on all of the one or more subblocks of memory, a scheme associated with performing the program verify operation on a subblock associated with each odd word line (WL) to be programmed, or a scheme associated with performing the program verify operation on a subblock associated with each even WL to be programmed. The memory device may execute the SLC program command by implementing the program verify scheme.

20 Claims, 9 Drawing Sheets

| WL | SB0 | SB1 | SB2 | SB3 |
|----|-----|-----|-----|-----|
| ⋮ | ⋮ | ⋮ | ⋮ | ⋮ |
| 3 | 1P1V | 1P0V | 1P0V | 1P0V |
| 2 | 1P0V | 1P0V | 1P0V | 1P0V |
| 1 | 1P1V | 1P0V | 1P0V | 1P0V |
| 0 | 1P1V | 1P0V | 1P0V | 1P0V |

510

Alternate odd WL program verify scheme

| WL | SB0 | SB1 | SB2 | SB3 |
|----|-----|-----|-----|-----|
| ⋮ | ⋮ | ⋮ | ⋮ | ⋮ |
| 3 | 1P0V | 1P0V | 1P0V | 1P0V |
| 2 | 1P1V | 1P0V | 1P0V | 1P0V |
| 1 | 1P0V | 1P0V | 1P0V | 1P0V |
| 0 | 1P1V | 1P0V | 1P0V | 1P0V |

508

Alternate even WL program verify scheme

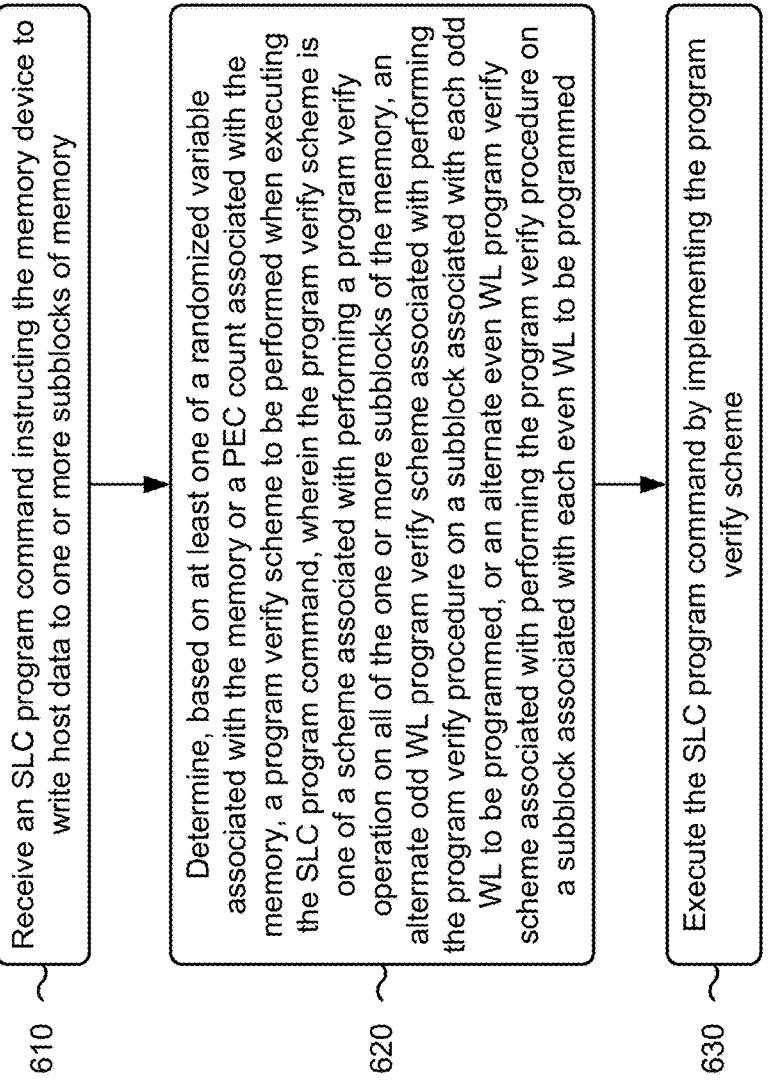

Receive an SLC program command instructing the memory device to write host data to one or more subblocks of memory

610

Determine, based on at least one of a randomized variable associated with the memory or a PEC count associated with the memory, a program verify scheme to be performed when executing the SLC program command, wherein the program verify scheme is one of a scheme associated with performing a program verify operation on all of the one or more subblocks of the memory, an alternate odd WL program verify scheme associated with performing the program verify procedure on a subblock associated with each odd WL to be programmed, or an alternate even WL program verify scheme associated with performing the program verify procedure on a subblock associated with each even WL to be programmed

620

Execute the SLC program command by implementing the program verify scheme

RANDOMIZED OR PROGRAM-ERASE-CYCLE-DEPENDENT PROGRAM VERIFY SCHEME

CROSS-REFERENCE TO RELATED APPLICATION

This Patent application claims priority to U.S. Provisional Patent Application No. 63/581,183, filed on Sep. 7, 2023, entitled "RANDOMIZED OR PROGRAM-ERASE-CYCLE-DEPENDENT PROGRAM VERIFY SCHEME," and assigned to the assignee hereof. The disclosure of the prior Application is considered part of and is incorporated by reference into this Patent Application.

TECHNICAL FIELD

The present disclosure generally relates to memory devices, memory device operations, and, for example, to a randomized program verify scheme or a program-erase-cycle-dependent program verify scheme.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). In some examples, a non-volatile memory cell, such as a NAND cell, may be categorized as a single-level cell (SLC), a multi-level cell (MLC), a triple-level cell (TLC), or a quad-level cell (QLC), among other examples. An SLC stores a single binary bit per memory cell, and thus may store either a binary 1 or a binary 0. An MLC, a TLC, and a QLC may store multiple bits per memory cell. More particularly, an MLC may store two binary bits per memory cell, a TLC may store three binary bits per memory cell, and a QLC may store four binary bits per memory cell. In some other examples, any cell capable of storing more than one binary bit per cell may be generally referred to as an MLC. To store information, an electronic device may write to, or program, a set of memory cells to a threshold voltage corresponding a binary value (e.g., one of 0 or 1 for an SLC; one of 00, 01, 10, or 11 for an MLC; and so forth). To access the stored information, the electronic device may read, or sense, the stored voltage from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIGS. 5A-5C are diagrams of an example associated with a randomized program verify scheme or a PEC-dependent program verify scheme, in accordance with some embodiments of the present disclosure.

FIG. 6 is a flowchart of an example method associated with a randomized program verify scheme or a PEC-dependent program verify scheme, in accordance with some embodiments of the present disclosure.

DETAILED DESCRIPTION

Figure 1:
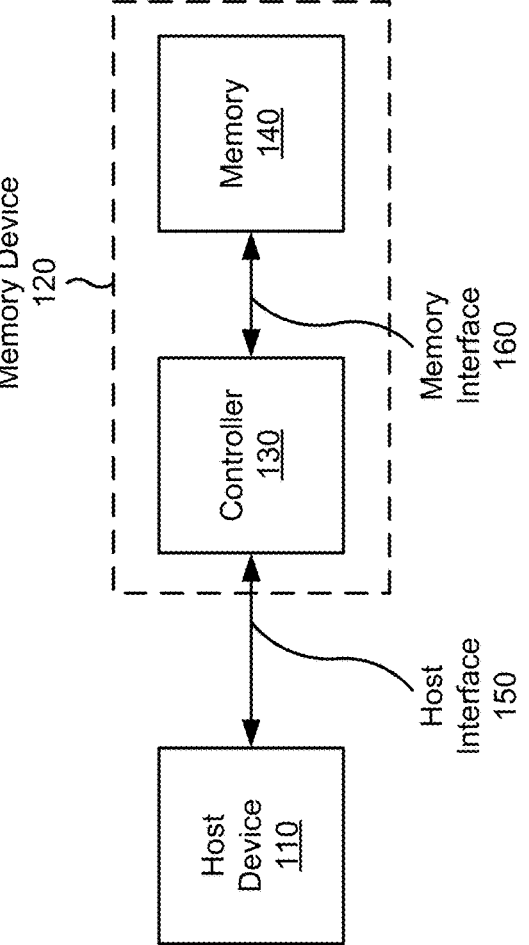
FIG. 1 is a diagram illustrating an example system capable of performing a randomized program verify scheme or a program erase cycle (PEC)-dependent program verify scheme, in accordance with some embodiments of the present disclosure.

Data may be programmed to a memory cell using a programming scheme (sometimes referred to as a programming operation, a write scheme, and/or a write operation). In some examples, a programming scheme may be associated with one or more programming pulses (sometimes referred to as one or more programming voltages) and one or more verify operations (sometimes referred to as one or more program verify operations, one or more verify pulses, and/or one or more verify voltages). During the one or more programming pulses, data may be written, or programmed, to one or more memory cells. For example, each programming pulse may be associated with programming a subblock of a memory die (e.g., a NAND die). During the one or more verify operations, data previously written to one or more memory cells (e.g., a subblock) via the one or more programming pulses may be verified to ensure that the data was properly written to the memory cell.

In some examples, a time needed to program each subblock of data may have a direct impact on a memory system performance. For example, a memory system may use single-level cell (SLC) memory caching for host data that is to be later transferred to a multi-bit cell memory during a background operation, such as a triple-level cell (TLC) memory or a quad-level cell (QLC) memory. Accordingly, a time associated with programming SLC memory may directly impact overall system performance. For example, an SLC programming scheme associated with a relatively high programming time may result in high power consumption and slow operation of the memory system, resulting in degraded system performance.

In some examples, in order to reduce a programming time associated with an SLC programming scheme, one or more programming pulses and/or verify pulses may be combined and/or eliminated, thereby reducing power consumption and/or increasing operation speed. For example, a verify pulse may be eliminated altogether, multiple programming pulses used to program multiple subblocks may be associated with a single verify pulse, and/or a single programming pulse may be used to program multiple subblocks in an effort to reduce a programming time associated with a programming scheme and otherwise improve system performance. However, eliminating a verify operation from a programming scheme may reduce system reliability, because the memory device does not include any mechanism to verify that host data was properly programmed to the SLC memory.

Accordingly, in some cases a program verify operation may be performed on a portion of a memory (e.g., a subset of subblocks being programmed) to ensure data is being properly programmed. For example, a program verify operation may be performed on a first subblock associated with each odd word line (WL) being programmed (sometimes referred to as an alternate odd WL program verify scheme), thereby serving as a spot check to ensure data is properly being written to the memory. Performing a program verify operation on one subblock of a WL may be indicative of whether other subblocks of the WL were successfully programmed, because the subblocks share the same WL plate.

However, a memory may be associated with unpredictable random defect WLs that may not be identified using only one program verify scheme, and thus implementing alternate odd WL program verify schemes or similar program verify schemes may fail to detect some defective WLs. For example, a memory may be associated with unpredictable random defect WLs that occur at even WLs, and thus always performing a program verify operation only on a first subblock associated with each odd WL being programmed may not identify certain defect WLs and/or may fail to detect program status failure (PSF) (e.g., approximately half of the WLs, such as even WLs, may never be verified). Accordingly, known program verify schemes provide an inherent tradeoff: either increase the amount of WLs for which a program verify operation is to be performed, resulting in resource-intensive programming schemes and/or a reduction in an overall performance benefit achieved by eliminating the one or more program verify operations, or else utilize a program verify operation that may fail to detect certain defective WLs, resulting in undetected PSF, lost data, and/or increased power, computing, and other resource consumption associated with recovering data.

Some implementations described herein enable a randomized program verify scheme and/or a program verify scheme that is dependent on a program erase cycle (PEC) count associated with a memory device. In a randomized program verify scheme, a type of program verify scheme being utilized by the memory device is randomly chosen for each programming operation, and in a PEC-dependent program verify scheme, a type of program verify scheme for each programming operation is chosen based on whether a PEC count associated with the memory satisfies a PEC threshold. In some implementations, a memory device may set a trim parameter (sometimes referred to herein as a program verify trim parameter) based on at least one of a randomized variable or a PEC count. In such implementations, when the trim parameter is set to a certain value, the memory device may implement the alternate odd WL program verify scheme, and when the trim value is set to a different value, the memory device may implement an alternate even WL program verify operation (e.g., a program verify scheme in which a program verify operation is performed on a first subblock associated with each even WL being programmed). In this way, over the course of multiple programming operations, each WL may ultimately be verified (e.g., a program verify operation may be performed on at least one subblock of each WL associated with a memory over the course of multiple programming operations), thereby increasing the probability of identifying random defect WLs and/or increasing the reliability of the memory device, all while performing relatively few program verify operations and thus reducing power, computing, and other resource consumption as compared to traditional program verify schemes and thus improving memory system performance.

FIG. 1 is a diagram illustrating an example system 100 capable of performing a randomized program verify scheme and/or a PEC-dependent program verify scheme. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to receive, from a host device, an SLC program command instructing the memory device to write host data to one or more subblocks of memory; determine, based on at least one of a randomized variable associated with the memory or a PEC count associated with the memory, a program verify scheme to be performed when executing the SLC program command, wherein the program verify scheme is one of a scheme associated with performing a program verify operation on all of the one or more subblocks of the memory, an alternate odd WL program verify scheme associated with performing the program verify operation on a subblock associated with each odd WL to be programmed, or an alternate even WL program verify scheme associated with performing the program verify operation on a subblock associated with each even WL to be programmed; and execute the SLC program command by implementing the program verify scheme.

In some implementations, one or more systems, devices, apparatuses, components, and/or controllers of FIG. 1 may be configured to receive an SLC program command instructing the memory device to write host data to one or more subblocks of memory; determine, based on at least one of a randomized variable associated with the memory or a PEC count associated with the memory, a program verify scheme to be performed when executing the SLC program command, wherein the program verify scheme is one of a scheme associated with performing a program verify operation on all of the one or more subblocks of the memory, an alternate odd WL program verify scheme associated with performing the program verify operation on a subblock associated with each odd WL to be programmed, or an alternate even WL program verify scheme associated with performing the program verify operation on a subblock associated with each even WL to be programmed; and execute the SLC program command by implementing the program verify scheme.

In some implementations, one or more systems, devices, apparatuses, components, and/or controllers of FIG. 1 may be configured to receive, from a host device, an SLC program command instructing the memory device to write host data to one or more subblocks of memory; set, based on at least one of a randomized variable associated with the memory or a PEC count associated with the memory, a program verify trim parameter associated with a program verify scheme to be performed when executing the SLC program command, wherein the program verify trim parameter is one of a first program verify trim parameter corresponding to a scheme associated with performing a program verify operation on all of the one or more subblocks of the memory, a second program verify trim parameter corresponding to an alternate odd WL program verify scheme associated with performing the program verify operation on a subblock associated with each odd WL to be programmed, or a third program verify trim parameter corresponding to an alternate even WL program verify scheme associated with performing the program verify operation on a subblock associated with each even WL to be programmed; and execute the SLC program command based on the trim parameter.

As indicated above, FIG. 1 is provided as an example. Other examples may differ from what is described with regard to FIG. 1.

Figure 2:
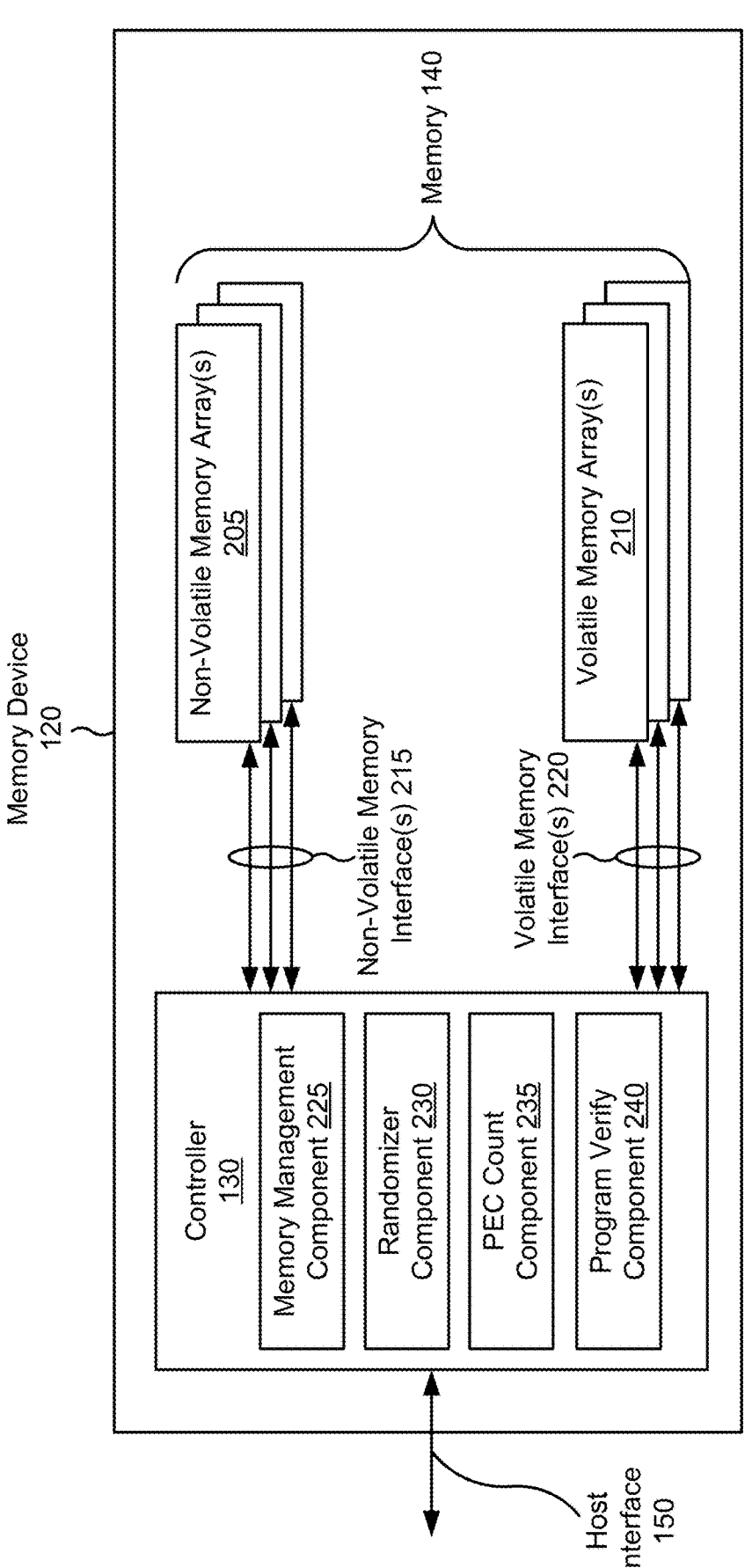
FIG. 2 is a diagram of example components included in a memory device, in accordance with some embodiments of the present disclosure.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a randomizer component 230, a PEC count component 235, and/or a program verify component 240. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The randomizer component 230 may be configured to determine a randomized variable. In some implementations, the randomizer component may be configured to determine a randomized variable based on host data to be programmed to the memory 140. For example, the randomizer component 230 may be configured to determine a randomized variable based on a most significant bit (MSB) of a bit line of host data to be programmed to the memory 140, a least significant bit (LSB) of the bit line of the host data to be programmed to the memory 140, and/or another bit of the bit line of the host data to be programmed to the memory 140.

The PEC count component 235 may be configured to count PECs associated with the memory 140 and/or otherwise determine a PEC count associated with memory 140. For example, the PEC count component 235 may be configured to track PECs associated with the memory 140 and/or maintain an updated PEC count associated with the memory 140 as program and erase operations are performed on the memory 140.

The program verify component 240 may be configured to identify whether a program verify operation is to be performed for a subblock of the memory 140 and/or determine a type of program verify scheme to be implemented in connection with a programming operation. In some implementations, the program verify component 240 may be configured to determine a type of program verify scheme to be implemented based on a randomized variable associated with the memory 140 (e.g., as determined by the randomizer component 230), and/or based on a PEC count associated with the memory 140 (e.g., as determined by the PEC count component 235). In some implementations, the program verify component 240 may be configured to set a program verify trim parameter associated with a programming scheme, which is described in more detail elsewhere herein.

One or more devices or components shown in FIG. 2 may be configured to perform operations described herein, such as one or more operations and/or methods described in connection with FIGS. 3-7. For example, the controller 130, the memory management component 225, the randomizer component 230, the PEC count component 235, and/or the program verify component 240 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
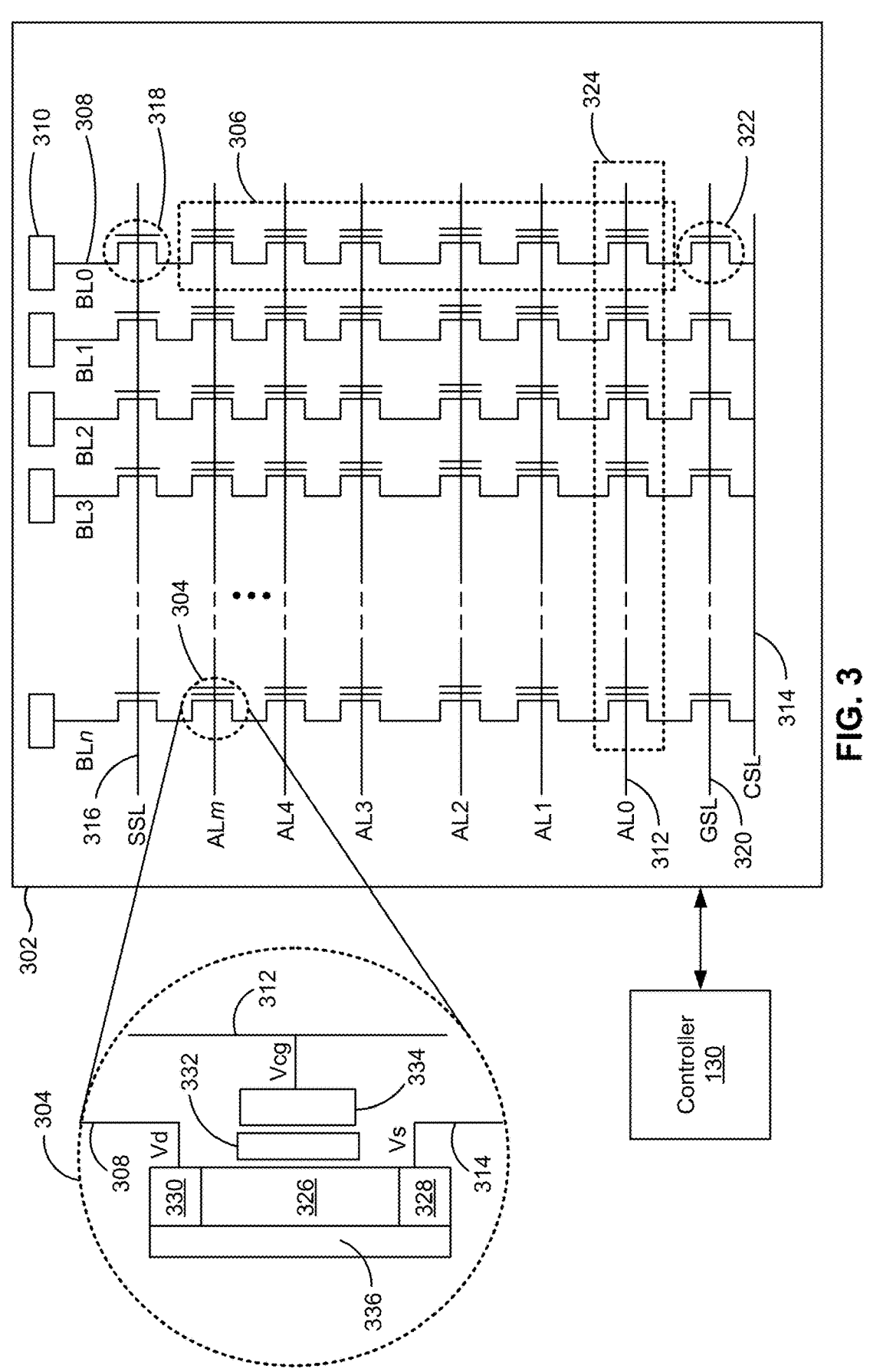
FIG. 3 is a diagram of example components included in a memory device, in accordance with some embodiments of the present disclosure.

FIG. 3 is a diagram of example components included in a memory device 120. As described above in connection with FIG. 1, the memory device 120 may include a controller 130 and memory 140. As shown in FIG. 3, the memory 140 may include a memory array 302, which may correspond to a non-volatile memory array 205 described above in connection with FIG. 2.

In FIG. 3, the memory array 302 is a NAND memory array. However, in some implementations, the memory array 302 may be another type of memory array, such as a NOR memory array, a resistive RAM (RRAM) memory array, a magnetoresistive RAM (MRAM) memory array, a ferroelectric RAM (FeRAM) memory array, a spin-transfer torque RAM (STT-RAM) memory array, or the like. In some implementations, the memory array 302 is part of a three-dimensional stack of memory arrays, such as 3D NAND flash memory, 3D NOR flash memory, or the like.

The memory array 302 includes multiple memory cells 304. A memory cell 304 may store an analog value, such as an electrical voltage or an electrical charge, that represents a data state (e.g., a digital value). The analog value and corresponding data state depend on a quantity of electrons trapped or present within a region of the memory cell 304 (e.g., in a charge trap, such as a floating gate), as described below.

A NAND string 306 (sometimes called a string) may include multiple memory cells 304 connected in series. A NAND string 306 is coupled to a bit line 308 (sometimes called a digit line or a column line, and shown as BL0-BLn). Data can be read from or written to the memory cells 304 of a NAND string 306 via a corresponding bit line 308 using one or more input/output (I/O) components 310 (e.g., an I/O circuit, an I/O bus, a page buffer, and/or a sensing component, such as a sense amplifier). Memory cells 304 of different NAND strings 306 (e.g., one memory cell 304 per NAND string 306) may be coupled with one another via access lines 312 (sometimes called word lines or row lines, and shown as AL0-ALm) that select which row (or rows) of memory cells 304 is affected by a memory operation (e.g., a read operation or a write operation).

A NAND string 306 may be connected to a bit line 308 at one end and a common source line (CSL) 314 at the other end. A string select line (SSL) 316 may be used to control respective string select transistors 318. A string select transistor 318 selectively couples a NAND string 306 to a corresponding bit line 308. A ground select line (GSL) 320 may be used to control respective ground select transistors 322. A ground select transistor 322 selectively couples a NAND string 306 to the common source line 314.

A "page" of memory (or "a memory page") may refer to a group of memory cells 304 connected to the same access line 312, as shown by reference number 324. In some implementations (e.g., for single-level cells), the memory cells 304 connected to an access line 312 may be associated with a single page of memory. In some implementations (e.g., for multi-level cells), the memory cells 304 connected to an access line 312 may be associated with multiple pages of memory, where each page represents one bit stored in each of the memory cells 304 (e.g., a lower page that represents a first bit stored in each memory cell 304 and an upper page that represents a second bit stored in each memory cell 304). In NAND memory, a page is the smallest physically addressable data unit for a write operation (sometimes called a program operation).

In some implementations, a memory cell 304 is a floating-gate transistor memory cell. In this case, the memory cell 304 may include a channel 326, a source region 328, a drain region 330, a floating gate 332, and a control gate 334. The source region 328, the drain region 330, and the channel 326 may be on a substrate 336 (e.g., a semiconductor substrate). The memory device 120 may store a data state in the memory cell 304 by charging the floating gate 332 to a particular voltage associated with the data state and/or to a voltage that is within a range of voltages associated with the data state. This results in a predefined amount of current flowing through the channel 326 (e.g., from the source region 328 to the drain region 330) when a specified read voltage is applied to the control gate 334 (e.g., by a corresponding access line 312 connected to the control gate 334). Although not shown, a tunnel oxide layer (or tunnel dielectric layer) may be interposed between the floating gate 332 and the channel 326, and a gate oxide layer (e.g., a gate dielectric layer) may be interposed between the floating gate 332 and the control gate 334. As shown, a drain voltage Vd may be supplied from a bit line 308, a control gate voltage Veg may be supplied from an access line 312, and a source voltage Vs may be supplied via the common source line 314 (which, in some implementations, is a ground voltage).

To write or program the memory cell 304, Fowler-Nordheim tunneling may be used. For example, a strong positive voltage potential may be created between the control gate 334 and the channel 326 (e.g., by applying a large positive voltage to the control gate 334 via a corresponding access line 312) while current is flowing through the channel 326 (e.g., from the common source line 314 to the bit line 308, or vice versa). The strong positive voltage at the control gate 334 causes electrons within the channel 326 to tunnel through the tunnel oxide layer and be trapped in the floating gate 332. These negatively charged electrons then act as an electron barrier between the control gate 334 and the channel 326 that increases the threshold voltage of the memory cell 304. The threshold voltage is a voltage required at the control gate 334 to cause current (e.g., a threshold amount of current) to flow through the channel 326. Fowler-Nordheim tunneling is an example technique for storing a charge in the floating gate, and other techniques, such as channel hot electron injection, may be used.

To read the memory cell 304, a read voltage may be applied to the control gate 334 (e.g., via a corresponding access line 312), and an I/O component 310 (e.g., a sense amplifier) may determine the data state of the memory cell 304 based on whether current passes through the memory cell 304 (e.g., the channel 326) due to the applied voltage. A pass voltage may be applied to all memory cells 304 (other than the memory cell 304 being read) in the same NAND string 306 as the memory cell 304 being read. For example, the pass voltage may be applied on each access line 312 other than the access line 312 of the memory cell 304 being read (e.g., where the read voltage is applied). The pass voltage is higher than the highest read voltage associated with any memory cell data states so that all of the other memory cells 304 in the NAND string 306 conduct, and the I/O component 310 can detect a data state of the memory cell 304 being read by sensing current (or lack thereof) on a corresponding bit line 308. For example, in a single-level memory cell that stores one of two data states, the data state is a "1" if current is detected, and the data state is a "0" if current is not detected. In a multi-level memory cell that stores one of three or more data states, multiple read voltages are applied, over time, to the control gate 334 to distinguish between the three or more data states and determine a data state of the memory cell 304.

To erase the memory cell 304, a strong negative voltage potential may be created between the control gate 334 and the channel 326 (e.g., by applying a large negative voltage to the control gate 334 via a corresponding access line 312). The strong negative voltage at the control gate 334 causes trapped electrons in the floating gate 332 to tunnel back across the oxide layer from the floating gate 332 to the channel 326 and to flow between the common source line 314 and the bit line 308. This removes the electron barrier between the control gate 334 and the channel 326 and decreases the threshold voltage of the memory cell 304 (e.g., to an empty or erased state, which may represent a "1"). In NAND memory, a block is the smallest unit of memory that can be erased. A block of NAND memory includes multiple pages. Thus, an individual page of a block cannot be erased without erasing every other page of the block. In some implementations, a block may be divided into multiple sub-blocks. A sub-block is a portion of a block and may include a subset of pages of the block and/or a subset of memory cells of the block.

As indicated above, FIG. 3 is provided as an example. Other examples may differ from what is described with regard to FIG. 3.

Figure 4:
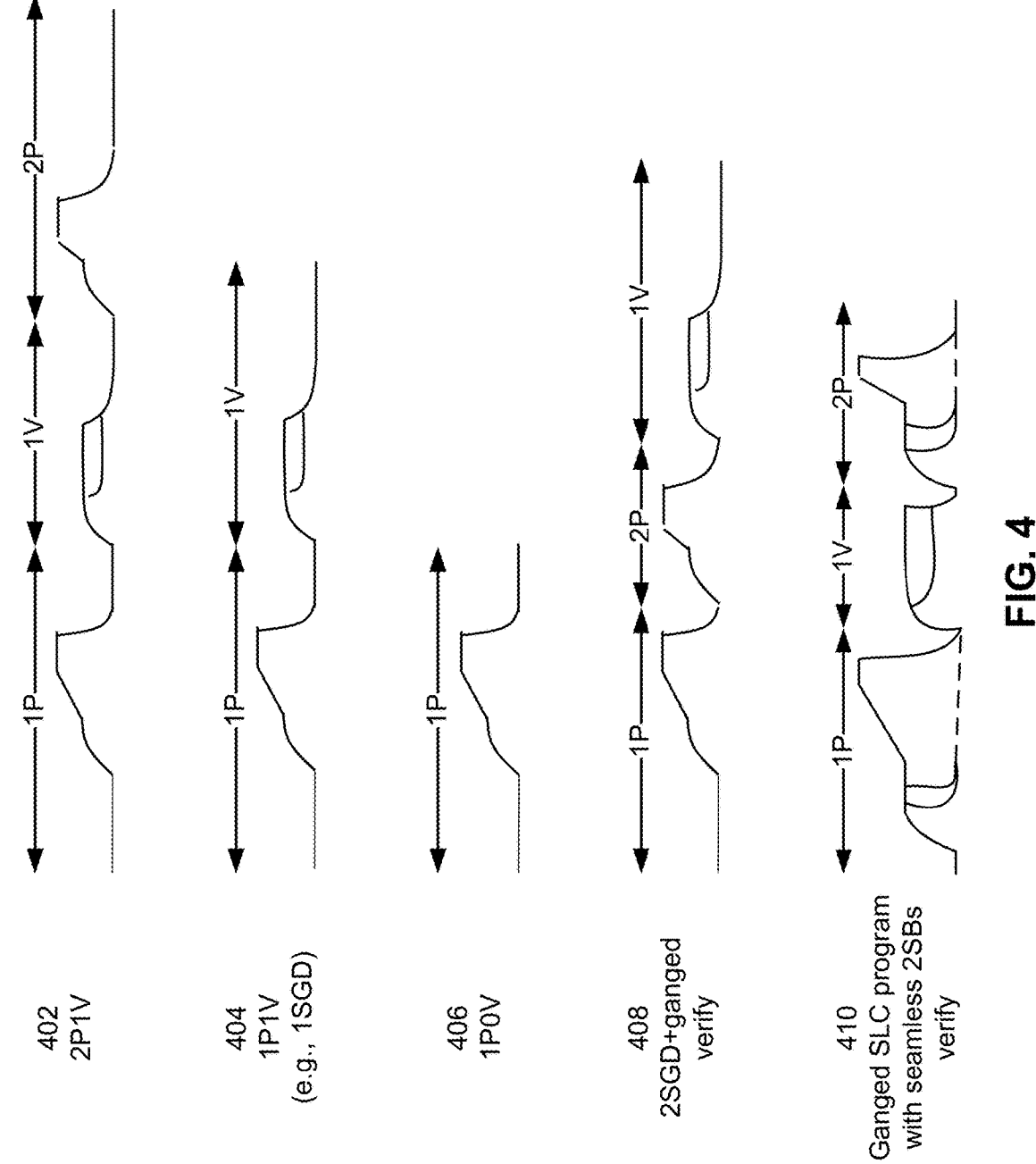
FIG. 4 is a diagram of an example of various single-level cell (SLC) programming schemes, in accordance with some embodiments of the present disclosure.

FIG. 4 is a diagram of an example 400 of various SLC programming schemes. The operations described in connection with FIG. 4 may be performed by the memory device 120 and/or one or more components of the memory device 120, such as the controller 130 and/or one or more components of the controller 130.

In some implementations, the memory device 120 may be configured to selectively implement one of multiple candidate programming schemes and/or operations. For example, in some implementations, the memory device 120 may be configured to use one of the programming schemes shown in FIG. 4 to program an SLC memory, such as for a purpose of caching host data in the SLC memory that may later be transferred to a TLC memory, a QLC memory, or another memory location during a background operation of the memory device 120.

As shown by reference number 402, in some implementations the memory device 120 may be configured to write host data to an SLC memory using two program pulses and one program verify operation, which may be referred to as a two-pulse, one-verify (2P1V) programming scheme. As shown, the example 2P1V programming scheme may include a first program pulse (shown as "1P") that is followed by a program verify operation (shown as "1V") that is followed by a second program pulse (shown as "2P"). In some implementations, the 2P1V write voltage pattern may be applied to a single subblock of memory to program the memory cells included in that subblock.

In some implementations, when a memory device 120 performs a 2P1V programming scheme, the memory device 120 may raise the voltage on a selected access line from a baseline voltage to a first program voltage during a first time period that corresponds to the first program pulse (e.g., 1P). The first program voltage may program a first set of memory cells (sometimes called pass memory cells) on the selected access line to a desired state and may fail to program a second set of memory cells (sometimes called fail memory cells) on the selected access line to the desired state.

After applying the first program voltage, the memory device 120 may reduce the voltage on the selected access line to the baseline voltage. The memory device 120 may then raise the voltage on the selected access line from the baseline voltage to a verify voltage during a second time period that corresponds to the program verify operation (e.g., 1V). After raising the voltage to the verify voltage, the memory device 120 may perform a sensing operation (e.g., a read operation) to detect whether the verify voltage applied to a memory cell causes that memory cell to conduct (e.g., whether current flows through the memory cell when the verify voltage is applied). Based on a desired state of the memory cell and based on whether the memory cell conducts when the verify voltage is applied, the memory device 120 may identify the memory cell as a pass memory cell that stores the desired state or a fail memory cell that does not store the desired state. For example, in an SLC that stores one of two data states, the memory device 120 may apply a verify voltage that is between a first threshold voltage corresponding to a first data state (e.g., 1) and a second threshold voltage corresponding to a second data state (e.g., 0). In this example, the memory cell stores the first data state (e.g., 1) if current is detected, and the memory cell stores the second data state (e.g., 0) if current is not detected. After applying the verify voltage, the memory device 120 may reduce the voltage on the selected access line to the baseline voltage.

The memory device 120 may then raise the voltage on the selected access line from the baseline voltage to a second program voltage during a third time period that corresponds to the second program pulse (e.g., 2P). The second program voltage may be greater in magnitude than the first program voltage, which may cause some or all of the fail memory cells (e.g., that were not successfully programmed to the desired state based on application of the first program voltage) being programmed to the desired state. After applying the second program voltage, the memory device 120 may reduce the voltage on the selected access line to the baseline voltage to complete the 2P1V programming.

In some implementations, memory cells that were successfully programmed by the first program voltage, as determined during the program verify operation, may be inhibited from being programmed with the second program voltage. This may increase endurance and prolong a lifespan of those memory cells, as compared to a scenario where the second program voltage is applied to those memory cells, by preventing the second program voltage from causing degradation of those memory cells. Thus, in some implementations, the 2P1V programming scheme may be considered a high endurance write operation compared to the other programming schemes described below. However, in some implementations, the 2P1V programming scheme may be considered a slow write operation as compared to the write voltage patterns described below. That is, an effective programming time associated with the 2P1V programming scheme (e.g., a time associated with programming a subblock of data) may be relatively high.

Accordingly, as shown by reference number 404, in some implementations the controller 130 may be configured to write host data to an SLC memory using one program pulse and one program verify operation, and thus may be called a one-pulse, one-verify (1P1V) programming scheme (sometimes alternatively referred to as a one select gate drain (1SGD) programming scheme). In such implementations, when a memory device 120 performs a 1P1V programming scheme, the memory device 120 may raise the voltage on a selected access line from a baseline voltage to a program voltage during a first time period that corresponds to a program pulse (e.g., 1P), in a similar manner as described above in connection the 2P1V programming scheme shown in connection with reference number 402. The memory device 120 may then perform a program verify operation (e.g., 1V) by applying a verify voltage during a second time period, in a similar manner as described above in connection with the 2P1V programming scheme shown in connection with reference number 402. Unlike the 2P1V programming scheme, the memory device 120 does not apply a second program pulse after performing the program verify operation in the 1P1V write operation. In some implementations, the program verify operation may be performed to determine whether at least a threshold quantity of memory cells have been successfully programmed. A write operation may pass or fail based on whether at least the threshold quantity of memory cells has been successfully programmed.

In some implementations, the program voltage of the 1P1V write operation is greater than the first program voltage of the 2P1V write operation described above in connection with reference number 402. For example, the program voltage of the 1P1V write operation may be greater than or equal to the second program voltage of the 2P1V write operation described above in connection with reference number 402. As a result, a greater quantity of memory cells may be programmed by the single program pulse of the 1P1V programming scheme as compared to the first program pulse of the 2P1V programming scheme. Because the 1P1V programming scheme includes fewer program pulses than the 2P1V programming scheme, the 1P1V programming scheme may be associated a faster write time than the 2P1V programming scheme (e.g., an effective programming time may be reduced as compared to the 2P1V programming scheme).

As shown by reference number 406, in some implementations the memory device 120 may be configured to write host data to an SLC memory using one program pulse and no verify program operations, and thus may be called a one-pulse, zero-verify (1P0V) programming scheme. In such implementations, when a memory device 120 performs a 1P0V programming scheme, the memory device 120 may raise the voltage on a selected access line from a baseline voltage to a program voltage during a first time period that corresponds to a program pulse (e.g., 1P), in a similar manner as described above in connection with reference numbers 402 and 404. Unlike the 2P1V write operation and the 1P1V write operation, however, the memory device 120 may not perform a program verify operation after applying the single program pulse in the 1P0V write operation.

In some implementations, the program voltage of the 1P0V write operation may be greater than the first program voltage of the 2P1V write operation described above in connection with reference number 402. For example, the program voltage of the 1P0V write operation may be greater than or equal to the second program voltage of the 2P1V write operation described above in connection with reference number 402. Additionally, or alternatively, the program voltage of the 1P0V write operation may be greater than or equal to the program voltage of the 1P1V write operation (because the memory device 120 does not verify that memory cells have been successfully programmed in the 1P0V write operation, and therefore may apply a greater voltage to increase the likelihood of successful programming).

As a result, a greater quantity of memory cells may be programmed by the single program pulse of the 1P0V write operation as compared to the first program pulse of the 2P1V write operation (and, in some implementations, as compared to the single program pulse of the 1P1V write operation). Because the 1P0V write operation includes fewer program pulses and fewer program verify operations than the 2P1V write operation, the 1P0V programming scheme may have a faster write time than the 2P1V programming scheme. Furthermore, because the 1P0V programming scheme includes fewer program verify operations than the 1P1V programming scheme, the 1P0V programming scheme may have a faster write time than the 1P1V programming scheme.

In some implementations, a verify operation may be associated with multiple subblocks (e.g., multiple programming pulses, each associated with a different subblock), thereby further reducing an effective programming time associated with each subblock. Such programming schemes may be referred to as "ganged" programming schemes and/or a verify operation associated with such a programming scheme may be referred to as a "ganged verify" operation. For example, reference number 408 shows one example of a ganged verify operation, sometimes referred to as a two select gate drain (2SGD) plus ganged verify programming scheme. In 2SGD plus ganged verify programming schemes, the memory device 120 may be configured to write host data to a first subblock of an SLC memory using one program pulse (e.g., 1P) and to write host data to a second subblock of SLC memory using another program pulse (e.g., 2P), with one program verify operation (e.g., 1V) ganged to the first program pulse and the second program pulse.

Put another way, for the 2SGD plus ganged verify programming scheme, the memory device 120 may apply a program pulse to each of two different subblocks of memory, and may then perform a group verify operation for both subblocks. For example, the memory device 120 may apply two program pulses (e.g., 1P and 2P), each associated with a different subblock of the memory device 120, followed by a program verify operation (e.g., a group program verify operation). A "subblock" is a portion of a memory block. For example, a subblock may include a subset of NAND strings and/or memory cells included in a block, and each subblock may be mutually exclusive from one another. A bit line may be shared by multiple subblocks. For example, a first subblock (e.g., Subblock 0) may include a first group of NAND strings, a second subblock (e.g., Subblock 1) may include a second group of NAND strings, a third subblock (e.g., Subblock 2) may include a third group of NAND strings, and a fourth subblock (e.g., Subblock 3) may include a fourth group of NAND strings. Each NAND string may include a respective memory cell that is on the selected access line being programmed.

As shown, the memory device 120 may apply a first program pulse (e.g., 1P) to the first subblock by applying a program voltage on the selected access line for the first subblock (e.g., while the first subblock is selected and the other subblocks are not selected) during a first time period, in a similar manner as described elsewhere herein. After applying the first program pulse, the memory device 120 may apply a second program pulse (e.g., 2P) to the second subblock by applying the program voltage on the selected access line for the second subblock (e.g., while the second subblock is selected and the other subblocks are not selected) during a second time period, in a similar manner as described elsewhere herein.

After applying a separate program pulse to each subblock, the memory device 120 may perform a group program verify operation (e.g., 1V) on all of the subblocks (e.g., simultaneously, concurrently, or in parallel). The group program verify operation may include applying a verify voltage during a third time period. The memory device 120 may apply the verify voltage to all of the subblocks, such as by selecting all of the subblocks while applying the verify voltage to the access line. After raising the voltage to the verify voltage, the memory device 120 may perform a sensing operation (e.g., a read operation) to detect memory cells that are programmed to the desired state and to detect memory cells that are not programmed to the desired state.

Because the 2SGD plus ganged verify programming scheme includes fewer total verify operations than the 2P1V programming scheme and/or the 1P1V programming scheme, the 2SGD plus ganged verify programming scheme may have a faster write time per subblock than the 2P1V programming scheme and/or the 1P1V programming scheme (e.g., an effective programming time associated with the 2SGD plus ganged verify programming scheme, which may be an average programming time per subblock programmed, may be less than the effective programming time of the 2P1V programming scheme and/or the 1P1V programming scheme).

Reference number 410 shows another example of a ganged verify operation, sometimes referred to as a ganged SLC program with ganged verify and/or seamless two subblocks verify programming scheme. In a ganged SLC program, the memory device 120 may be capable of programming two or more sub-blocks with a single program pulse. In the example shown by reference number 410, the memory device 120 may apply a first program pulse (e.g., 1P) configured to write to two subblocks of the memory device 120 (e.g., Subblock 0 and Subblock 1), followed by a group program verify operation (e.g., 1V) on the two subblocks, followed by a second program pulse (e.g., 2P) configured to write to the two subblocks of the memory device. In some implementations, such as implementations utilizing a seamless two subblocks verify operation, the memory device 120 may sense a voltage written to each subblock twice, with each select gate drain (SGD) and bit line signal being toggled separately. In some other implementations, a ganged SLC program may alternatively be combined with a ganged verify operation, such as the ganged verify operation described above in connection with reference number 408.

For example, the memory device 120 may apply the first program pulse (e.g., 1P) to the first subblock and the second subblock by applying a first program voltage on the selected access line for the first subblock and the second subblock during a first time period. After applying the first program pulse, the memory device 120 may perform a group program verify operation (e.g., 1V) on the first subblock and the second subblock (e.g., simultaneously, concurrently, or in parallel). The group program verify operation may include applying a verify voltage during a second time period, in a similar manner as described above in connection with the 2SGD plus ganged verify programming scheme and/or in a manner associated with the seamless two subblocks verify operation described above. The memory device 120 may identify pass memory cells and fail memory cells in the first subblock and the second subblock, and may apply the second program pulse (e.g., 2P) to the first subblock and the second subblock by applying a second program voltage on the selected access line for fail memory cells of the first subblock and the second subblock during a third time period. Because the ganged SLC program with ganged verify and/or seamless two subblocks verify programming scheme is capable of writing to multiple subblocks using the same program pulse, the ganged SLC program with ganged verify and/or seamless two subblocks verify programming scheme may have a faster write time on a per-subblock basis than the 1P1V programming scheme and/or the 2SGD plus ganged verify programming scheme.

In some examples, eliminating a verify operation from a given programming scheme may result in improved system performance, because a programming time and/or power consumption associated with programming each subblock of memory 140 may be reduced. For example, with respect to an SLC program operation, using a 1P0V programming scheme (e.g., the 1P0V programming scheme described above in connection with reference number 406) rather than a 1P1V programming scheme (e.g., the 1P1V programming scheme described above in connection with reference number 404) may result in a programming time reduction of multiple microseconds (us) per subblock. This may result in memory system performance improvement, an average reduction in a supply current and/or a common collector current (Icc), and/or a reduction in energy per bit (EPB) consumption.

However, eliminating all verify operations from a programming operation may result in undetected PSF. Accordingly, in order to perform some verification of programming operations, a memory device 120 may implement a reduced number of program verify operations, such as by implementing an alternate odd WL program verify scheme in which a program verify operation may be performed on a first subblock associated with each odd WL being programmed. Performing a program verify operation on one subblock of a WL may be indicative of whether other subblocks of the WL were successfully programmed, because the subblocks share the same WL plate.

However, a memory 140 may be associated with unpredictable random defect WLs that may not be identified using a single program verify scheme, and thus implementing an alternate odd WL program verify scheme or a similar program verify scheme may fail to detect some defective WLs. For example, a memory 140 may be associated with unpredictable random defect WLs that occur at even word lines, and thus always performing a program verify operation only on a first subblock of each odd WL being programmed may not identify certain defect WLs and/or may fail to detect PSF (e.g., approximately half of the WLs, such as even WLs, may never be verified).

Some implementations described herein enable a randomized program verify scheme and/or a PEC-dependent program verify scheme such that, over the course of multiple programming operations, each WL may ultimately be verified (e.g., a program verify operation may be performed on at least one subblock of each WL associated with a memory over the course of multiple programming operations). Aspects of the randomized program verify scheme and/or the PEC-dependent program verify scheme are described in more detail below in connection with FIGS. 5A-5C.

As indicated above, FIG. 4 is provided as an example. Other examples may differ from what is described with regard to FIG. 4.

Figure 5A:
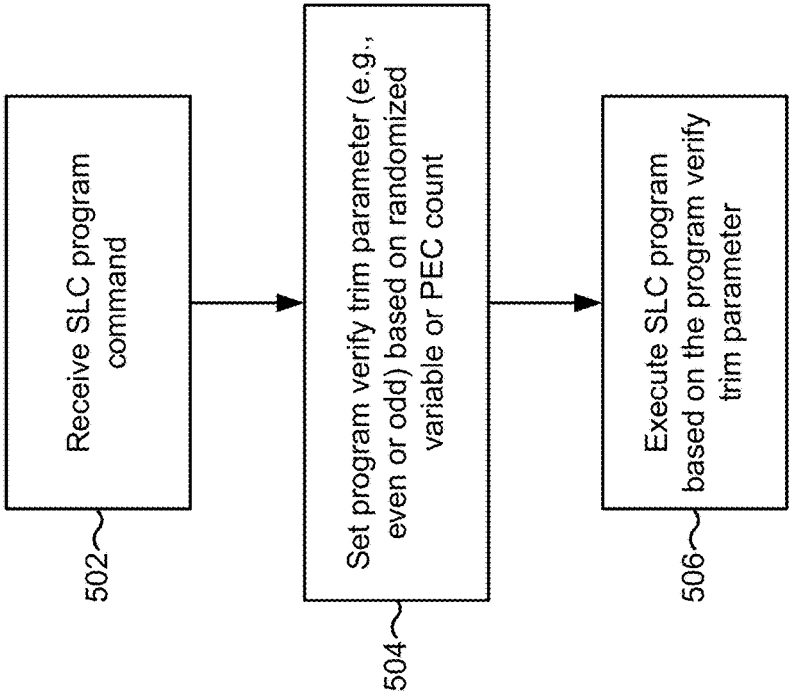
Figure 5C:
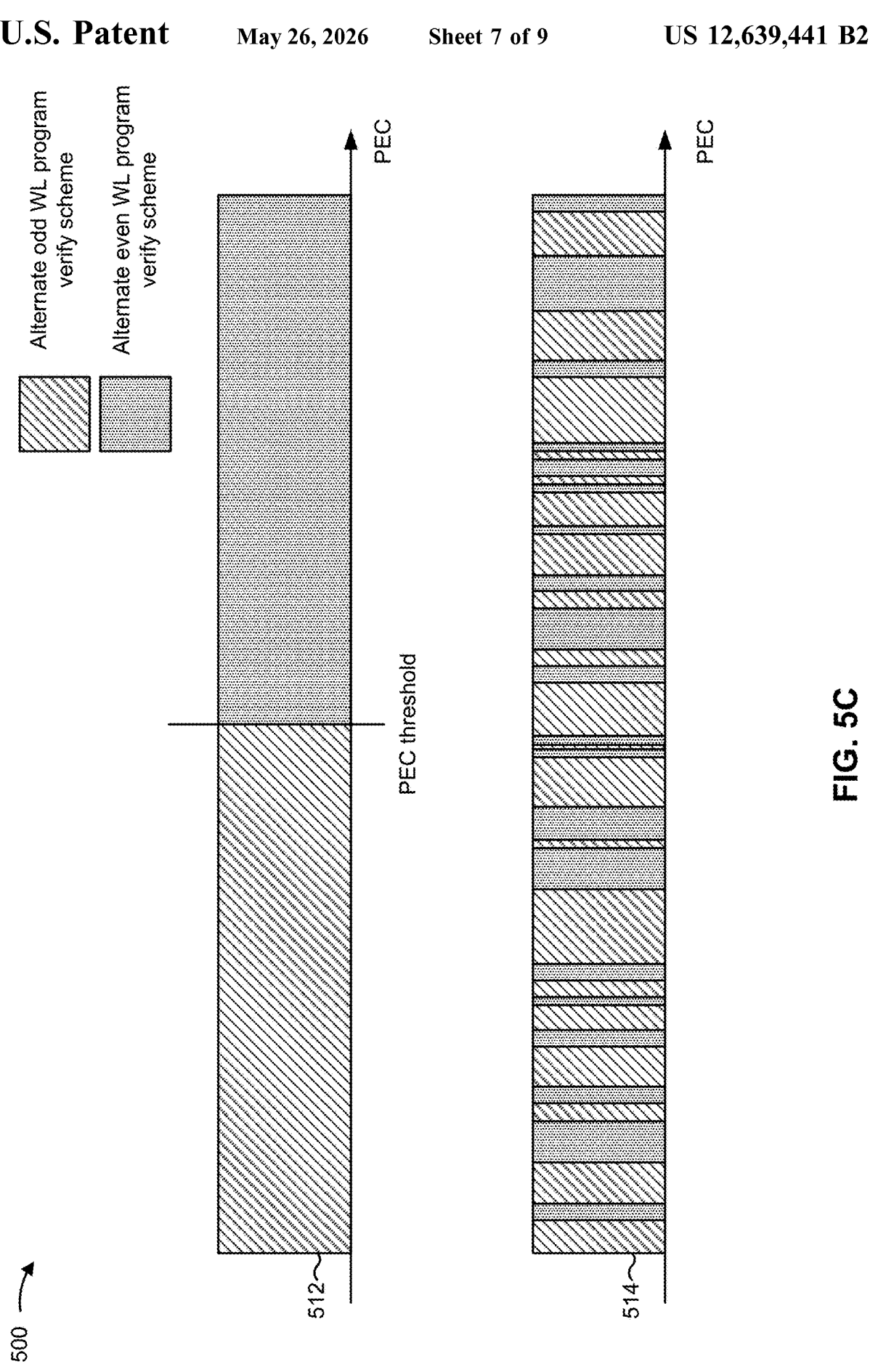

FIGS. 5A-5C are diagrams of an example 500 associated with a randomized program verify scheme or a PEC-dependent program verify scheme. The operations described in connection with FIGS. 5A-5C may be performed by the memory device 120 and/or one or more components of the memory device 120, such as the controller 130 and/or one or more components of the controller 130.

As shown in FIG. 5A, and as indicated by reference number 502, the memory device 120 may receive, from a host device 110, an SLC program command. For example, the memory device 120 may be a NAND memory device (e.g., an SSD) that is capable of caching host data to SLC memory and then later moving the host data to an MLC memory, a TLC memory, a QLC memory, or a similar memory during a background process of the memory device 120. In that regard, when host data is to be written to memory (e.g., memory 140) of the memory device 120, the memory device 120 may receive the SLC program command described above in connection with reference number 502. In some implementations, the SLC program command may instruct the memory device 120 to write host data to one or more subblocks of memory 140. For example, the SLC program command may instruct the memory device 120 to write the host data to one or more of the subblocks described above in connection with FIGS. 3 and 4.

As indicated by reference number 504, upon receiving the SLC program command, the memory device 120 may set a program verify trim parameter associated with the SLC program command and/or may otherwise determine a program verify scheme to be used in connection with the SLC program command. In some implementations, the memory device 120 may set the program verify trim parameter and/or otherwise determine the program verify scheme to be used in connection with the SLC program command based on a randomized variable and/or a PEC count. Put another way, in some implementations the memory device 120 may determine, based on at least one of a randomized variable associated with the memory 140 or a PEC count associated with the memory 140, a program verify scheme to be performed when executing the SLC program command. In some implementations, such as in implementations in which the memory device 120 sets the program verify trim parameter and/or determines the program verify scheme to be used based on the randomized variable, the memory device 120 may determine the randomized variable via the randomizer component 230, as described above in connection with FIG. 2. Additionally, or alternatively, in implementations in which the memory device 120 sets the program verify trim parameter and/or determines the program verify scheme to be used based on the PEC count, the memory device 120 may determine the PEC count via the PEC count component 235, as described above in connection with FIG. 2.

In some implementations, the selected program verify scheme (e.g., the program verify scheme selected based on the randomized variable and/or the PEC count) may be a scheme associated with performing a program verify operation on all of the one or more subblocks of the memory 140 (e.g., a program verify scheme in which a program verify operation is performed on all pages of the memory 140 being programmed). In some other implementations, the selected program verify scheme (e.g., the program verify scheme selected based on the randomized variable and/or the PEC count) may be an alternate odd WL program verify scheme associated with performing the program verify operation on a subblock associated with each odd WL being programmed (e.g., a program verify scheme in which a program verify operation is performed on less than all of the pages of the memory 140 being programmed, such as only on a first subblock of all odd WLs being programmed). In some other implementations, the selected program verify scheme (e.g., the program verify scheme selected based on the randomized variable and/or the PEC count) may be an alternate even WL program verify scheme associated with performing the program verify operation on a subblock associated with each even WL being programmed (e.g., a program verify scheme in which a program verify operation is performed on less than all of the pages of the memory 140 being programmed, such as only on a first subblock of all even WLs being programmed). Aspects of the various program verify schemes that may be determined to be used based on a randomized variable and/or a PEC count are described in more detail below in connection with FIG. 5B.

In some implementations, the memory device 120 (e.g., the program verify component 240 of the memory device 120) may be configured to set a program verify trim parameter based on the at least one of the randomized variable associated with the memory 140 or the PEC count associated with the memory 140 (e.g., the memory device 120 may be configured to set a program verify trim parameter corresponding to the program verify scheme to be performed in connection with the SLC programming operation). For example, the memory device 120 may set the program verify trim parameter to a first program verify trim parameter (e.g., "0") when the scheme associated with performing the program verify operation on all of the one or more subblocks of the memory 140 is to be performed (e.g., when all pages of the memory 140 associated with the write command will be verified). Moreover, the memory device 120 may set the program verify trim parameter to a second program verify trim parameter (e.g., "1") when the alternate odd WL program verify scheme is to be performed (e.g., when only a subblock associated with each odd WL being programmed will be verified). And the memory device 120 may set the program verify trim parameter to a third program verify trim parameter (e.g., "2") when the alternate even WL program verify scheme is to be performed (e.g., when only a subblock associated with each even WL being programmed will be verified).

As indicated by reference number 506, the memory device 120 may execute the SLC program based on the program verify trim parameter and/or the selected program verify scheme. More particularly, the memory device 120 may execute the SLC program command by implementing the selected program verify scheme, which, in some implementations, may be indicated by the program verify trim parameter set by the memory device 120. In this way, memory device 120 may be associated with reduced power consumption and/or increased performance as compared to memory devices in which each subblock is verified after programming, because the memory device 120 may perform a program verify operation on less than all subblocks being programmed (e.g., when implementing the alternate odd WL program verify scheme or the alternate even WL program verify scheme). Moreover, the memory device 120 may exhibit increased reliability and/or improved data loss prevention as compared to memory devices that only implement a single program verify scheme (e.g., as compared to memory devices that only implement an alternate odd WL program verify scheme), because the type of program verify scheme implemented may be randomized and/or PEC-dependent, thereby resulting in each WL ultimately being verified over a course of multiple programming operations and/or identification of random defect WLs over a course of multiple programming operations.

FIG. 5B depicts examples of an alternate odd WL program verify scheme and an alternate even WL program verify scheme that may be implemented by the memory device 120 according to some implementations. More particularly, reference number 508 indicates one example of an alternate even WL program verify scheme. As shown, the alternate even WL program verify scheme may be associated with performing a program verify operation (e.g., performing a 1P1V programming operation, which, as described above in connection with FIG. 4, includes a program verify pulse) on a subblock associated with each even WL. More particularly, in the example shown in FIG. 5, a program verify operation (e.g., a program verify pulse associated with a 1P1V programming operation) may be performed on a first subblock (shown as "SB0" in FIG. 5B) of each evenly indexed WL (e.g., WL 2, 4, 6, and so forth). Moreover, in some implementations, the memory device 120 may be configured to perform a program verify operation on a subblock associated with a first WL (e.g., WL 0) regardless of the specific program verify scheme being implemented, such as for a purpose of identify a dynamic start voltage (DSV) associated with a programming scheme, or the like. Accordingly, as shown in FIG. 5B, a program verify operation (e.g., a program verify pulse associated with a 1P1V programming operation) may be performed on a first subblock (e.g., SB0) of the first indexed WL (e.g., WL 0). For the remaining subblocks, including the second and subsequent subblocks (shown in FIG. 5B as SB1, SB2, and SB3) for WL 0 and the even WLs, as well as all subblocks (e.g., SB0-SB3) of the odd WLs (e.g., WL 1, WL 3, and so forth), a program verify operation may be omitted. For example, a programming operation may be implemented that omits a program verify pulse, such as a 1P0V programming operation, as shown in FIG. 5B. In this way, the alternate even WL program verify operation may reduce power consumption and increase system performance as compared to systems in which a program verify operation is performed on all subblocks being programmed.

Similarly, reference number 510 indicates one example of an alternate odd WL program verify scheme. As shown, the alternate odd WL program verify scheme may be associated with performing a program verify operation (e.g., performing a 1P1V programming operation, which, as described above in connection with FIG. 4, includes a program verify pulse) on a subblock associated with each odd WL. More particularly, in the example shown in FIG. 5, a program verify operation (e.g., a program verify pulse associated with a 1P1V programming operation) may be performed on a first subblock (e.g., SB0) of each oddly indexed WL (e.g., WL 1, 3, 5, and so forth). Moreover, in some implementations, the memory device 120 may be configured to perform a program verify operation on a subblock associated with a first WL (e.g., WL 0) regardless of the specific program verify scheme being implemented, such as for a purpose of identifying a DSV associated with a programming scheme, or the like. Accordingly, as shown in FIG. 5B, a program verify operation (e.g., a program verify pulse associated with a 1P1V programming operation) may be performed on a first subblock (e.g., SB0) of the first indexed WL (e.g., WL 0). For the remaining subblocks, including the second and subsequent subblocks (e.g., SB1, SB2, and SB3) for WL 0 and the odd WLs, as well as all subblocks (e.g., SB0-SB4) of the even WLs (e.g., WL 2, WL 4, and so forth), a program verify operation may be omitted. For example, a programming operation may be implemented that omits a program verify pulse, such as a 1P0V programming operation, as shown in FIG. 5B. In this way, the alternate odd WL program verify operation may reduce power consumption and increase system performance as compared to systems in which a program verify operation is performed on all subblocks being programmed.

Although in the examples shown and described above in connection with reference numbers 508 and 510 a program verify operation is performed on a first subblock (e.g., SB0) of a corresponding WL, in some other implementations, a program verify operation may be performed on a subblock other than a first subblock of a corresponding WL. For example, for the alternate even WL program scheme, the program verify operation (e.g., a program verify pulse associated with a 1P1V programming operation) may be performed on SB1, SB2, SB3, or another subblock associated with each even WL and/or the first WL (e.g., WL 0). Similarly, for the alternate odd WL program scheme, the program verify operation (e.g., a program verify pulse associated with a 1P1V programming operation) may be performed on SB1, SB2, SB3, or another subblock associated with each odd WL and/or the first WL (e.g., WL 0).

Although not shown in FIG. 5B, in some implementations the memory device may perform a program verify scheme associated with performing a program verify operation on all of the one or more subblocks of the memory being programmed. For example, in some implementations, the memory device 120 may perform a 1P1V programming operation on each subblock (e.g., SB0, SB1, SB2, and SB3) of each WL. This may be because a PEC count of the memory device 120 has surpassed a reliability threshold or the like, and thus a program verify operation is performed on each subblock in order to ensure all host data was successfully written to the memory 140 and/or to detect any PSF. For example, the memory device 120 may determine if a PEC count associated with the memory 140 surpasses a reliability threshold, and, if so, may perform a program verify operation (e.g., a program verify pulse associated with a 1P1V programming operation) on each subblock of memory being programmed.

As described above in connection with FIG. 5A, in some implementations the memory device 120 may select the particular program verify scheme to be implemented based on a randomized variable or a PEC count. For example, as shown in FIG. 5C, reference number 512 depicts an example of a PEC-dependent program verify scheme. In such implementations, the memory device 120 may be hardcoded with and/or may otherwise determine a PEC threshold, which may be any integer. In such implementations, upon receiving a program command (e.g., the SLC program command described above in connection with reference number 502), the memory device 120 may determine a PEC count associated with the memory 140 (e.g., via the PEC count component 235) and/or may compare the PEC count to the PEC threshold (e.g., an integer). If the PEC count does not satisfy a PEC threshold, the memory device 120 may determine that one of the alternate odd WL program verify scheme or the alternate even WL program verify scheme is to be performed, and, if the PEC count does satisfy the PEC threshold, the memory device 120 may determine that the other one of the alternate odd WL program verify scheme or the alternate even WL program verify scheme is to be performed. More particularly, in the example shown in FIG. 5C, when the PEC count is below the PEC threshold, the memory device 120 may determine that the alternate odd WL program verify scheme is be performed. Moreover, when the PEC count is at or above the PEC threshold, the memory device 120 may determine that the alternate even WL program verify scheme is be performed. In this way, the memory device 120 may ultimately verify all WLs in a memory 140 over the course of multiple programming operations, and thus may identify any random defect WLs that may have otherwise been overlooked if only one program verify scheme was implemented.

As further shown in FIG. 5C, reference number 514 depicts an example randomized program verify scheme. In such implementations, upon receiving a program command (e.g., the SLC program command described above in connection with reference number 502), the memory device 120 may determine a randomized variable (e.g., via the randomizer component 230), such as one of "0" or "1." When the randomized variable is "0," the memory device 120 may perform a first program verify scheme (e.g., one of the alternate odd WL program verify scheme or the alternate even WL program verify scheme), and when the randomized variable is "1," the memory device 120 may perform a second program verify scheme (e.g., the other one of the alternate odd WL program verify scheme or the alternate even WL program verify scheme). In some implementations, the randomized variable may be based on one of an MSB associated with the host data, an LSB associated with the host data, or the like. For example, in some implementations the randomized variable may be the bit value (e.g., one of "0" or "1") of the MSB of the bit line of the host data to be programmed to the memory 140. In some other implementations, the randomized variable may be the bit value (e.g., one of "0" or "1") of the LSB of the bit line of the host data to be programmed to the memory 140. In this way, the memory device 120 may ultimately verify all WLs in a memory 140 over the course of multiple programming cycles, and thus may identify any random defect WLs that may have otherwise been overlooked if only one program verify scheme was implemented.

As indicated above, FIGS. 5A-5C are provided as an example. Other examples may differ from what is described with regard to FIGS. 5A-5C.

FIG. 6 is a flowchart of an example method 600 associated with a randomized program verify scheme or a PEC-dependent program verify scheme. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, the randomizer component 230, the PEC count component 235, and/or the program verify component 240) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include receiving an SLC program command instructing the memory device to write host data to one or more subblocks of memory (block 610). As further shown in FIG. 6, the method 600 may include determining, based on at least one of a randomized variable associated with the memory or a PEC count associated with the memory, a program verify scheme to be performed when executing the SLC program command, wherein the program verify scheme is one of performing a program verify operation on all of the one or more subblocks of the memory, an alternate odd WL program verify scheme associated with performing the program verify operation on a subblock associated with each odd WL to be programmed, or an alternate even WL program verify scheme associated with performing the program verify operation on a subblock associated with each even WL to be programmed (block 620). As further shown in FIG. 6, the method 600 may include executing the SLC program command by implementing the program verify scheme (block 630).

The method 600 may include additional aspects, such as any single aspect or any combination of aspects described below and/or described in connection with one or more other methods or operations described elsewhere herein.

In a first aspect, the method 600 includes setting a program verify trim parameter based on the at least one of the randomized variable associated with the memory or the PEC count associated with the memory, wherein the program verify trim parameter is one of a first program verify trim parameter associated with the scheme associated with performing the program verify operation on all of the one or more subblocks of the memory, a second program verify trim parameter associated with the alternate odd WL program verify scheme, or a third program verify trim parameter associated with the alternate even WL program verify scheme.

In a second aspect, alone or in combination with the first aspect, the subblock associated with each odd WL is a first subblock of each odd WL, and the subblock associated with each even WL is a first subblock of each even WL.

In a third aspect, alone or in combination with one or more of the first and second aspects, the subblock associated with each odd WL is a subblock other than a first subblock of each odd WL, and the subblock associated with each even WL is a subblock other than first subblock of each even WL.

In a fourth aspect, alone or in combination with one or more of the first through third aspects, determining the program verify scheme includes determining the program verify scheme based on the randomized variable, and the randomized variable is based on one of a most significant bit associated with the host data or a least significant bit associated with the host data.

In a fifth aspect, alone or in combination with one or more of the first through fourth aspects, determining the program verify scheme includes determining the program verify scheme based on the PEC count, when the PEC count does not satisfy a PEC threshold, the method comprises determining that one of the alternate odd WL program verify scheme or the alternate even WL program verify scheme is to be performed, and, when the PEC count does satisfy a PEC threshold, the method comprises determining that the other one of the alternate odd WL program verify scheme or the alternate even WL program verify scheme is to be performed.

In a sixth aspect, alone or in combination with one or more of the first through fifth aspects, the alternate odd WL program verify scheme is further associated with performing the program verify operation on a subblock associated with a first WL associated with the memory, and the alternate even WL program verify scheme is further associated with performing the program verify operation on the subblock associated with the first WL associated with the memory.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

Figure 7:
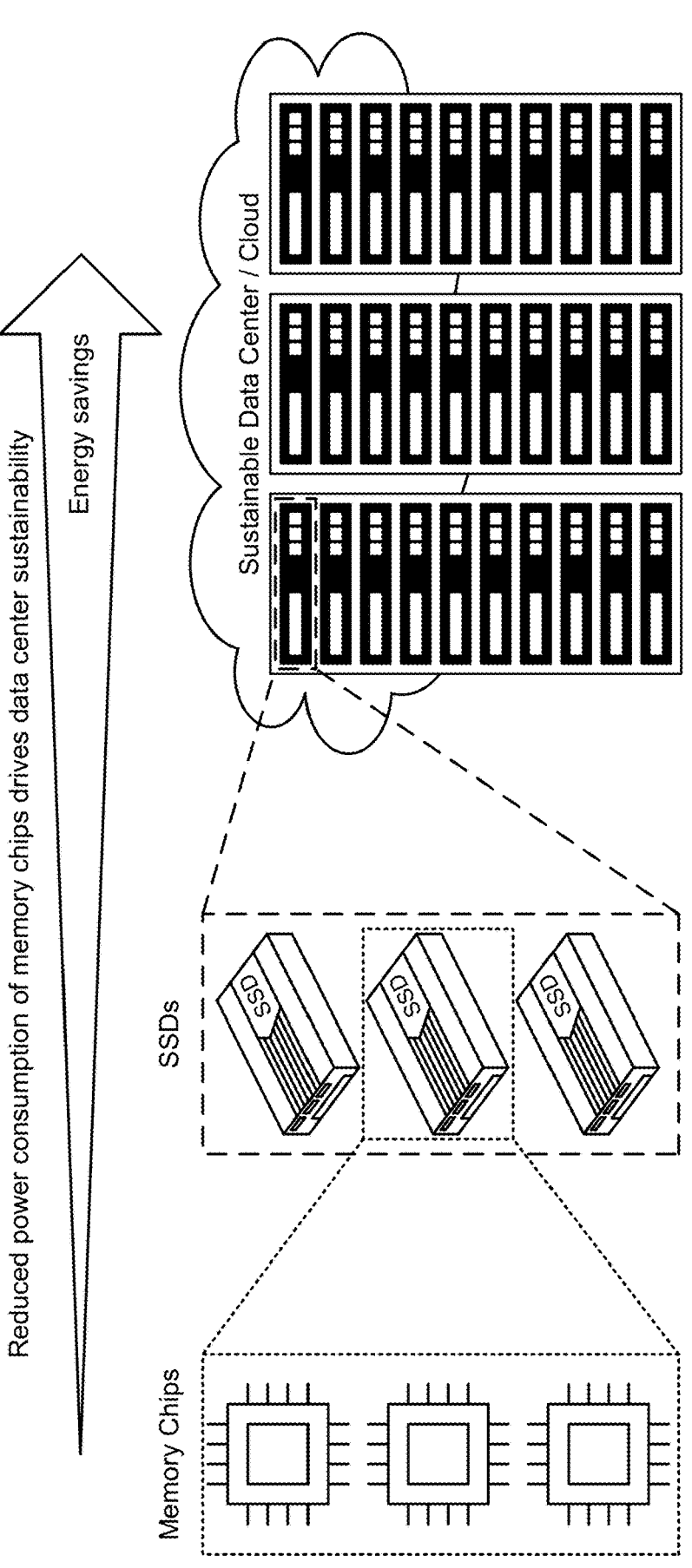
FIG. 7 is a diagram illustrating example systems in which the memory device described herein may be used, in accordance with some embodiments of the present disclosure.

FIG. 7 is a diagram illustrating example systems in which the memory device 120 described herein may be used. In some implementations, one or more memory devices 120 may be included in a memory chip. Multiple memory chips may be packaged together and included in a higher level system, such as an SSD or another type of memory drive. Each SSD may include, for example, up to five memory chips, up to ten memory chips, or more. A data center or cloud computing environment may include multiple SSDs to store a large amount of data. For example, a data center may include hundreds, thousands, or more SSDs.

As described above, some implementations described herein reduce power consumption of a memory device 120. As shown in FIG. 7, this reduced power consumption drives data center sustainability and leads to energy savings because of the large volume of memory devices 120 included in a data center.

As indicated above, FIG. 7 is provided as an example. Other examples may differ from what is described with regard to FIG. 7.

In some implementations, a memory device includes one or more components configured to: receive, from a host device, an SLC program command instructing the memory device to write host data to one or more subblocks of memory; determine, based on at least one of a randomized variable associated with the memory or a PEC count associated with the memory, a program verify scheme to be performed when executing the SLC program command, wherein the program verify scheme is one of: a scheme associated with performing a program verify operation on all of the one or more subblocks of the memory, an alternate odd WL program verify scheme associated with performing the program verify operation on a subblock associated with each odd WL to be programmed, or an alternate even WL program verify scheme associated with performing the program verify operation on a subblock associated with each even WL to be programmed; and execute the SLC program command by implementing the program verify scheme.

In some implementations, a method for performing a program verify operation includes receiving, by a memory device from a host device, an SLC program command instructing the memory device to write host data to one or more subblocks of memory; determining, based on at least one of a randomized variable associated with the memory or one of a randomized variable associated with the memory or a PEC count associated with the memory, a program verify scheme to be performed when executing the SLC program command, wherein the program verify scheme is one of: a scheme associated with performing a program verify operation on all of the one or more subblocks of the memory, an alternate odd WL program verify scheme associated with performing the program verify operation on a subblock associated with each odd WL to be programmed, or an alternate even WL program verify scheme associated with performing the program verify operation on a subblock associated with each even WL to be programmed; and executing, by a memory device, the SLC program command by implementing the program verify scheme.

In some implementations, a memory device includes one or more components configured to: receive, from a host device, an SLC program command instructing the memory device to write host data to one or more subblocks of memory; set, based on at least one of a randomized variable associated with the memory or a PEC count associated with the memory, a program verify trim parameter associated with a program verify scheme to be performed when executing the SLC program command, wherein the program verify trim parameter is one of: a first program verify trim parameter corresponding to a scheme associated with performing a program verify operation on all of the one or more subblocks of the memory, a second program verify trim parameter corresponding to an alternate odd WL program verify scheme associated with performing the program verify operation on a subblock associated with each odd WL to be programmed, or a third program verify trim parameter corresponding to an alternate even WL program verify scheme associated with performing the program verify operation on a subblock associated with each even WL to be programmed; and execute the SLC program command based on the trim parameter.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the term "approximately" means "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:
1. A memory device, comprising:
   one or more components configured to:
      receive, from a host device, a single-level cell (SLC) program command instructing the memory device to write host data to one or more subblocks of memory;
      determine, based on at least one of a randomized variable associated with the memory or a program-erase cycle (PEC) count associated with the memory, a program verify scheme to be performed when executing the SLC program command, wherein the program verify scheme is one of:
         a scheme associated with performing a program verify operation on all of the one or more subblocks of the memory,
         an alternate odd word line (WL) program verify scheme associated with performing the program verify operation on a subblock associated with each odd WL to be programmed, or
         an alternate even WL program verify scheme associated with performing the program verify operation on a subblock associated with each even WL to be programmed; and execute the SLC program command by implementing the program verify scheme.

2. The memory device of claim 1, wherein the one or more components are further configured to set a program verify trim parameter based on the at least one of the randomized variable associated with the memory or the PEC count associated with the memory, wherein the program verify trim parameter is one of:

a first program verify trim parameter associated with the scheme associated with performing the program verify operation on all of the one or more subblocks of the memory, a second program verify trim parameter associated with the alternate odd WL program verify scheme, or a third program verify trim parameter associated with the alternate even WL program verify scheme.

3. The memory device of claim 1, wherein the subblock associated with each odd WL is a first subblock of each odd WL, and wherein the subblock associated with each even WL is a first subblock of each even WL.

4. The memory device of claim 1, wherein the subblock associated with each odd WL is a subblock other than a first subblock of each odd WL, and wherein the subblock associated with each even WL is a subblock other than a first subblock of each even WL.

5. The memory device of claim 1, wherein, to determine the program verify scheme, the one or more components are further configured to determine the program verify scheme based on the randomized variable, and wherein the randomized variable is based on one of a most significant bit associated with the host data or a least significant bit associated with the host data.

6. The memory device of claim 1, wherein, to determine the program verify scheme, the one or more components are further configured to determine the program verify scheme based on the PEC count, wherein, when the PEC count does not satisfy a PEC threshold, the one or more components are further configured to determine that one of the alternate odd WL program verify scheme or the alternate even WL program verify scheme is to be performed, and wherein, when the PEC count does satisfy the PEC threshold, the one or more components are further configured to determine that the other one of the alternate odd WL program verify scheme or the alternate even WL program verify scheme is to be performed.

7. The memory device of claim 1, wherein the alternate odd WL program verify scheme is further associated with performing the program verify operation on a subblock associated with a first WL associated with the memory, and wherein the alternate even WL program verify scheme is further associated with performing the program verify operation on the subblock associated with the first WL associated with the memory.

8. A method for performing a program verify operation, comprising:

receiving, by a memory device from a host device, a single-level cell (SLC) program command instructing the memory device to write host data to one or more subblocks of memory;

determining, based on at least one of a randomized variable associated with the memory or a program-erase cycle (PEC) count associated with the memory, a program verify scheme to be performed when executing the SLC program command, wherein the program verify scheme is one of:

a scheme associated with performing a program verify operation on all of the one or more subblocks of the memory, an alternate odd word line (WL) program verify scheme associated with performing the program verify operation on a subblock associated with each odd WL to be programmed, or an alternate even WL program verify scheme associated with performing the program verify operation on a subblock associated with each even WL to be programmed; and executing, by a memory device, the SLC program command by implementing the program verify scheme.

9. The method of claim 8, further comprising setting a program verify trim parameter based on the at least one of the randomized variable associated with the memory or the PEC count associated with the memory, wherein the program verify trim parameter is one of:

a first program verify trim parameter associated with the scheme associated with performing the program verify operation on all of the one or more subblocks of the memory, a second program verify trim parameter associated with the alternate odd WL program verify scheme, or a third program verify trim parameter associated with the alternate even WL program verify scheme.

10. The method of claim 8, wherein the subblock associated with each odd WL is a first subblock of each odd WL, and wherein the subblock associated with each even WL is a first subblock of each even WL.

11. The method of claim 8, wherein the subblock associated with each odd WL is a subblock other than a first subblock of each odd WL, and wherein the subblock associated with each even WL is a subblock other than a first subblock of each even WL.

12. The method of claim 8, wherein determining the program verify scheme includes determining the program verify scheme based on the randomized variable, and wherein the randomized variable is based on one of a most significant bit associated with the host data or a least significant bit associated with the host data.

13. The method of claim 8, wherein determining the program verify scheme includes determining the program verify scheme based on the PEC count, wherein, when the PEC count does not satisfy a PEC threshold, the method comprises determining that one of the alternate odd WL program verify scheme or the alternate even WL program verify scheme is to be performed, and wherein, when the PEC count does satisfy a PEC threshold, the method comprises determining that the other one of the alternate odd WL program verify scheme or the alternate even WL program verify scheme is to be performed.

14. The method of claim 8, wherein the alternate odd WL program verify scheme is further associated with performing the program verify operation on a subblock associated with a first WL associated with the memory, and wherein the alternate even WL program verify scheme is further associated with performing the program verify operation on the subblock associated with the first WL associated with the memory.

15. A memory device, comprising:

one or more components configured to:

receive, from a host device, a single-level cell (SLC) program command instructing the memory device to write host data to one or more subblocks of memory;

set, based on at least one of a randomized variable associated with the memory or a program-erase cycle (PEC) count associated with the memory, a program verify trim parameter associated with a program verify scheme to be performed when executing the SLC program command, wherein the program verify trim parameter is one of:

a first program verify trim parameter corresponding to a scheme associated with performing a program verify operation on all of the one or more subblocks of the memory, a second program verify trim parameter corresponding to an alternate odd word line (WL) program verify scheme associated with performing the program verify operation on a subblock associated with each odd WL to be programmed, or a third program verify trim parameter corresponding to an alternate even WL program verify scheme associated with performing the program verify operation on a subblock associated with each even WL to be programmed; and execute the SLC program command based on the trim parameter.

16. The memory device of claim 15, wherein the subblock associated with each odd WL is a first subblock of each odd WL, and wherein the subblock associated with each even WL is a first subblock of each even WL.

17. The memory device of claim 15, wherein the subblock associated with each odd WL is a subblock other than a first subblock of each odd WL, and wherein the subblock associated with each even WL is a subblock other than a first subblock of each even WL.

18. The memory device of claim 15, wherein, to determine the program verify scheme, the one or more components are further configured to determine the program verify scheme based on the randomized variable, and wherein the randomized variable is based on one of a most significant bit associated with the host data or a least significant bit associated with the host data.

19. The memory device of claim 15, wherein, to determine the program verify scheme, the one or more components are further configured to determine the program verify scheme based on the PEC count, wherein, when the PEC count does not satisfy a PEC threshold, the one or more components are further configured to determine that one of the alternate odd WL program verify scheme or the alternate even WL program verify scheme is to be performed, and wherein, when the PEC count does satisfy a PEC threshold, the one or more components are further configured to determine that the other one of the alternate odd WL program verify scheme or the alternate even WL program verify scheme is to be performed.

20. The memory device of claim 15, wherein the alternate odd WL program verify scheme is further associated with performing the program verify operation on a subblock associated with a first WL associated with the memory, and wherein the alternate even WL program verify scheme is further associated with performing the program verify operation on the subblock associated with the first WL associated with the memory.

* * * * *